United States Patent

[11] 3,582,757

| | | |
|---|---|---|
| [72] | Inventors | Thomas Achinger<br>North Syracuse;<br>Charles W. Van Marter, W. Syracuse both of, N.Y. |
| [21] | Appl. No. | 005,810 |
| [22] | Filed | Jan. 26, 1970 |
| [45] | Patented | June 1, 1971 |
| [73] | Assignee | General Electric Company |

[54] PARALLEL LATCHING INVERTER
10 Claims, 3 Drawing Figs.

[52] U.S. Cl. .................................................. 321/11,
321/45R, 321/45C
[51] Int. Cl. .................................................. H02m 1/18,
H02m 7/52
[50] Field of Search .................................. 321/44, 45,
45 C, 45 S, 11

[56] References Cited
UNITED STATES PATENTS

| | | | |
|---|---|---|---|
| 3,303,406 | 2/1967 | Bedford .................... | 321/45X |
| 3,315,145 | 4/1967 | Menard ..................... | 321/44 |
| 3,341,767 | 9/1967 | Ciezo ....................... | 321/45 |
| 3,406,327 | 10/1968 | Mapham et al. .......... | 321/45 |

*Primary Examiner*—William H. Beha, Jr.
*Attorneys*—Carl W. Baker, Frank L. Neuhauser, Oscar B. Waddell and Joseph B. Forman ABSTRACT: An inverter of controlled rectifier type in which switching transients across the rectifiers are minimized by commutation circuitry which accomplishes the load voltage switching and also provides full feedback of the commutation energy. The inverter comprises series-connected main controlled rectifiers each paralleled by a commutating circuit including a commutating controlled rectifier, an inductor and capacitance means, in a circuit arrangement such that the cyclical charge and discharge of the capacitance means commutates one of the main controlled rectifiers for the end of each load voltage half-cycle and switches the load voltage preparatory to the start of the next.

PATENTED JUN 1 1971 3,582,757
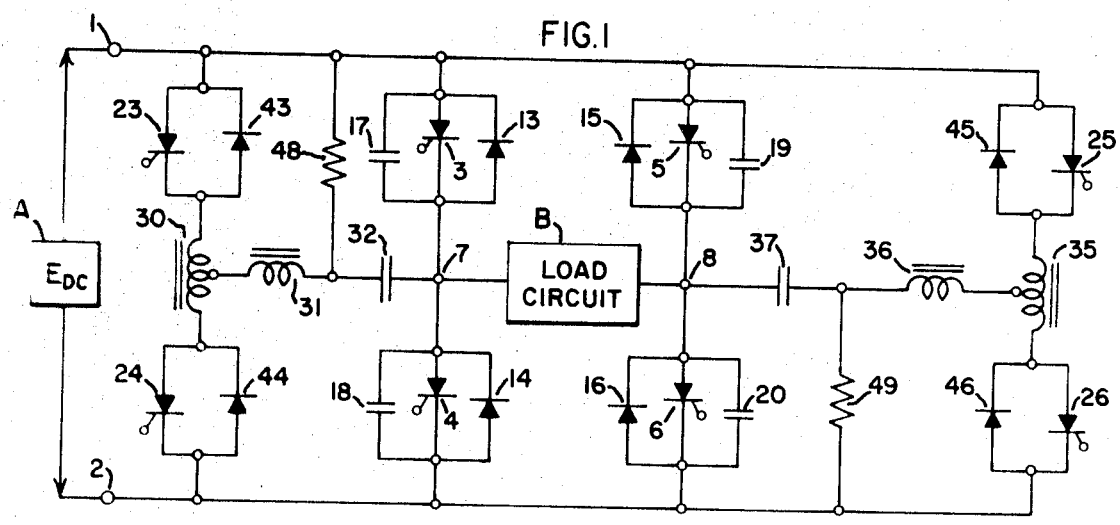
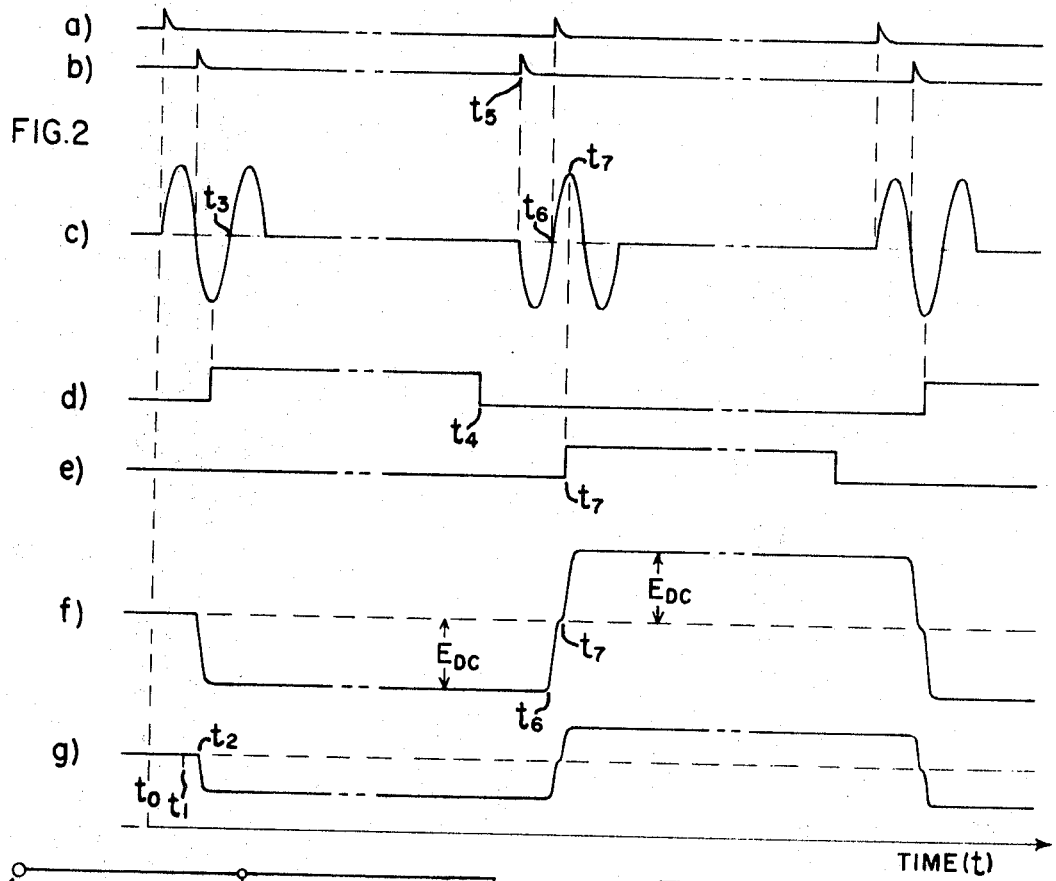
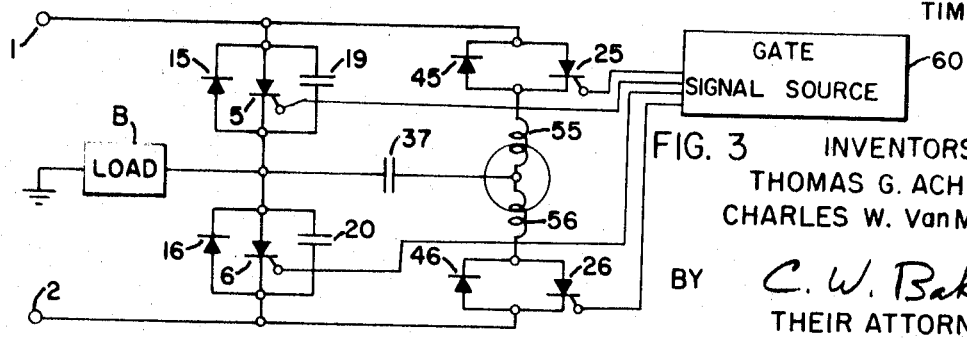
INVENTORS:
THOMAS G. ACHINGER,
CHARLES W. Van MARTER,
BY  C. W. Baker
THEIR ATTORNEY.

PARALLEL LATCHING INVERTER

BACKGROUND OF THE INVENTION

This invention relates to inverter circuits for producing AC voltage output from a DC voltage source. More specifically, the present invention relates to inverter circuits employing controlled rectifiers.

An inverter circuit converts DC voltage to AC causing the DC voltage to flow to the load in periodically reversing direction. In a typical circuit, first and second controlled rectifiers are connected in series across a DC voltage source, in an arrangement called a half-bridge or series inverter. The controlled rectifiers are alternately rendered conductive so that the potential at a terminal intermediate the two controlled rectifiers alternates with respect to a reference level. The terminal is connected to a load which utilizes the AC voltage thus provided. Voltage of a first polarity is supplied to the load during the first half-cycle of the inverter output, and voltage of a second polarity is supplied during the second half-cycle. The same aspects discussed below apply as well to full-bridge, or more simply, bridge inverters. Bridge inverters comprise first and second pairs of controlled rectifiers connected in a bridge with a load connected across intermediate terminals.

Since controlled rectifiers do not turn themselves off, a commutation circuit must be provided to reverse bias a conducting controlled rectifier at the end of the half-cycle to turn it off. One prior commutation scheme comprises the provision of first and second commutating controlled rectifiers connected across the main controlled rectifiers. First and second inductors are connected between the two commutating rectifiers and a capacitor is connected from the junction of the two inductors to the terminal intermediate the two main controlled rectifiers. In this scheme, the capacitor charges while one main controlled rectifier is conducting. At the end of a half-cycle one of the commutating controlled rectifiers is gated to discharge the capacitor to switch the polarity of load voltage and commutate the conducting main controlled rectifier.

While this scheme operates satisfactorily under many conditions, it is disadvantageous in certain respect. While one of the main controlled rectifiers is conducting, the entire potential of the direct current voltage source is placed across the nonconducting controlled rectifier. Thus at the beginning of a half-cycle, when one main controlled rectifier is turned on, a step voltage is applied across the nonconducting controlled rectifier. This is known as application of large $dv/dt$ since there is a large, sudden change of the voltage across the controlled rectifier. This condition creates a danger of false triggering of the nonconducting controlled rectifier. If for any reason the nonconducting controlled rectifier should turn on, a direct short circuit, commonly called a "shoot-through," would be placed across the direct current voltage source. Also, once the commutating operation is completed, no further use is made of the electrical energy applied to the commutation circuitry. In addition, in this prior circuit a main controlled rectifier is turned on when the load voltage is switched, so that a large voltage may be suddenly applied across the other controlled rectifier when it is gated.

SUMMARY OF THE INVENTION

It is therefore an object of the present invention to provide an inverter circuit utilizing controlled rectifiers in which application of a large $dv/dt$ never occurs.

It is also an object of the present invention to provide an inverter circuit of the type described in which feedback energy of the commutation circuitry is utilized to provide an efficient and reliable switching operation.

It is a further object of the present invention to provide an inverter circuit of the type described in which the main controlled rectifiers latch into the circuit, i.e. come into conduction after the load voltage has been commutated, rather than having a step voltage applied across them.

Briefly stated, in accordance with one form of the present invention there is provided an inverter of bridge configuration in which opposite ends of the bridge are connected across a DC voltage source and a load is connnected across the middle of the bridge. First and second main controlled rectifiers are connected across one side of the bridge and third and fourth controlled rectifiers are connected across the other side of the bridge. Each leg of the bridge has connected across it a commutating leg, each including therein a commutating controlled rectifier. A center-tapped inductor is connected between each pair of commutating controlled rectifiers, and a capacitor is connected between each of the bridge load terminals and the center tap of one inductor. A diode is connected across each of the main and commutating controlled rectifiers and poled for conduction in the direction opposite to that of its associated controlled rectifier. Alternate pairs of main controlled rectifiers are alternately rendered conductive to provide an AC load voltage, the capacitors providing commutation energy. The diodes and other elements provide proper conduction paths to prevent application of large $dv/dt$ across any of the main controlled rectifiers, assure proper charging and discharging of the capacitors, and channel feedback energy from the commutating circuitry to reinforce the switching operation.

BRIEF DESCRIPTION OF THE DRAWINGS

The circuitry with which the above-described objects are achieved and the novel features of the present invention are particularly pointed out in the claims forming the concluding portion of the specification. The invention, both as to its construction and manner of operation, together with further advantages attained through its use, may be further understood by reference to the following drawings taken in connection with the following description.

In the drawings:

FIG. 1 is a schematic illustration of a bridge configuration inverter incorporating the present invention connected to a direct current voltage source for supplying an alternating current voltage to a load;

FIG. 2 is a waveform chart useful in understanding the operation of the circuit illustrated in FIG. 1; and FIG. 3 is a schematic illustration of another embodiment of the present invention.

DESCRIPTION OF THE PREFERRED EMBODIMENTS

FIG. 1 is illustrative of an inverter circuit constructed in accordance with the invention. The inverter circuit is illustrated connected to a direct current voltage source A for supplying an alternating current voltage output to a load B. The inverter circuit is connected across source A by means of upper and lower source terminals 1 and 2.

The bridge arrangement comprising the main controlled rectifiers includes controlled rectifiers 3—6, each connected in a bridge leg. Controlled rectifiers 3 and 4 are connected in series between terminals 1 and 2, and controlled rectifiers 5 and 6 are also connected in series between these terminals 1 and 2. A terminal 7 is connected intermediate the controlled rectifiers 3 and 4, and a terminal 8 is connected intermediate the controlled rectifiers 5 and 6. The load B is connected between the intermediate terminals 7 and 8. Each of the controlled rectifiers 3—6 is poled for conduction in the direction from terminal 1 to terminal 2 in order to provide an AC output voltage at terminals 7 and 8. Controlled rectifiers 3 and 6 are rendered conductive during a first half-cycle of inverter output voltage, and controlled rectifiers 5 and 4 are rendered conductive during the succeeding half-cycle. The rectifiers 3—6 are rendered conductive at appropriate times by provision of gating signals to their gates from an appropriate signal source (not shown) which may be, for example, a ring counter.

In order to commutate, or turn off, appropriate pairs of the controlled rectifiers 3—6 at the end of each half-cycle, switch the polarity of the load voltage, and perform other functions described below, commutation circuitry is provided. In order to provide a conduction path for reverse voltages to commutate the controlled rectifiers 3—6, diodes 13—16 are connected across the rectifiers 3—6 respectively and poled for conduction in the opposite direction. In addition, if desired, capacitors 17—20 may each be connected across controlled rectifiers 3—6 respectively, for damping transients due to stray reactance in the component leads.

Energy for commutating pairs of the main controlled rectifiers 3—6 is conducted from the source terminals 1 and 2 by means of commutating controlled rectifiers 23—26 each included in a commutating leg. Commutating rectifier 23 has its anode connected to the upper source terminal 1 and its cathode connected to the upper end of a center-tapped inductor 30, which comprises first and second inductor portions. The lower end of inductor 30 is connected to the anode of controlled rectifier 24, which has its cathode connected to terminal 2. The center tap at inductor 30 is connected to one end of an inductor 31 which has its other end coupled to one terminal of a capacitor 32. The other terminal of capacitor 32 is connected to terminal 7.

Similarly, the anode of the controlled rectifier 25 is connected to terminal 1, its cathode is connected to the upper end of a center-tapped inductor 35, which includes third and fourth inductor portions, having its lower end connected to the anode of controlled rectifier 26, the cathode of which is connected to terminal 2. The center tap of the inductor 35 is connected to one end of an inductor 36 having its other end connected to one terminal of a capacitor 37. The other terminal of the capacitor 37 is coupled to terminal 8. The commutating circuitry further comprises diodes 43—46 each connected across one of the controlled rectifiers 23—26 respectively and poled in the opposite direction. A starting starting resistor 48 is connected between terminal 1 and capacitor 32, and a starting resistor 49 is connected between terminal 2 and capacitor 37 to charge the capacitors 32 and 37 for initial operation of the inverter circuit.

OPERATION OF THE CIRCUIT

The operation of the circuit is explained with reference to FIG. 2 as well as FIG. 1. FIG. 2a is representative of the gating signals applied to controlled rectifiers 23 and 26; FIG. 2b represents the trigger signals applied to the gates of controlled rectifiers 24 and 25. FIG. 2c illustrates the current flowing through capacitor 32. It should be noted that the current flowing through capacitor 37 is at all times of the same magnitude as the current flowing through capacitor 32, but is of the opposite polarity. The gating signals for controlled rectifiers 4 and 5 and for controlled rectifiers 3 and 6 are respectively illustrated in FIGS. 2d and 2e. The output voltage of the inverter circuit as supplied to load B from terminals 7 and 8 is illustrated in FIG. 2f, while FIG. 2g represents current flowing through load B. There are three half-cycles, of waveform as shown in FIG. 2, at the commutation frequency $f_s$.

Before operation begins, capacitors 32 and 37 are each charged through resistors 48 and 49 to a level of E/2, which is one-half the level or potential supplied by the source A. The first commutating half-cycle begins with the simultaneous application of triggering signals to the gates of controlled rectifiers 23 and 26 at time $t_0$, as indicated in FIG. 2a. Capacitors 32 and 37, if not already fully charged through resistors 48 and 49, then charge through controlled rectifier 23, inductors 30 and 31, load B, inductors 35 and 36, and controlled rectifier 26. At the initiation of operation, however, triggering the controlled rectifiers 23 and 26 to commutate controlled rectifiers 3 and 6 has no effect since controlled rectifiers 3 and 6 are initially nonconducting. However, proper polarities of charge on capacitors 32 and 37 are thus assured, to prepare for switching the load voltage.

Controlled rectifiers 24 and 25 are triggered at time $t_1$ which occurs $1/2f_s$ seconds after $t_0$, where $f_s$ is the sine wave inverter frequency, i.e. the commutation frequency, which is determined by the time constants of the LC circuits including inductors 30, 31, 35 and 36 and capacitors 32 and 37. At time $t_1$, controlled rectifiers 24 and 25 are triggered (FIG. 2b) to cause capacitors 32 and 37 to discharge in the direction opposite to that in which they charged during the first half cycle of the commutating operation, i.e. from right to left in FIG. 1, and as they discharge the potential across inductors 31 and 36 decays. When the potential across inductors 31 and 36 reaches zero the current therethrough is at a maximum, and as the current decreases, the potential thereacross reverses. Capacitors 32 and 37 therefore remain charged with the potentials thereacross being reversed.

Capacitor 32 discharges through inductor inductor 31, the lower half of inductor 30, controlled rectifier 24 and diode 14. Capacitor 37 discharges through diode 15, controlled rectifier 25, the upper half of inductor 35, and inductor 36. Values of the circuit elements are chosen such that the peak currents through capacitors 32 and 37 are sufficient to switch the load current. It should be noted that at the initiation of operation, however, the load current and voltage are zero (FIGS. 2f and 2g).

The current through capacitors 32 and 37 reaches its peak at time $t_2$ (FIG. 2c) which occurs $1.5\pi\sqrt{LC}$ seconds after time $t_0$, where L is the inductance of inductor 31 plus one-half that of inductor 30 measured in henries, and C is the value of capacitor 32 in farads. It should be noted that capacitor 37 is chosen to have the same value as capacitor 32 and that inductors 36 and 35 are chosen to have the same values as inductors 31 and 30 respectively. At time $t_2$, controlled rectifiers 4 and 5 are gated into continuous conduction (FIG. 2d). Thus controlled rectifiers 4 and 5 latch into the circuit. More specifically, controlled rectifiers 4 and 5 become conductive when the voltage across them is near zero volts and become more strongly conductive as load current and voltage increase toward their maximum levels. No sudden surges are applied to either of the controlled rectifiers 4 or 5.

After controlled rectifiers 4 and 5 are gated, capacitors 32 and 37 continue to discharge and then are recycled by recharging to their original state, i.e. to the same magnitude and polarity of charge as they had at the time $t_1$, beginning at time $t_3$ (FIG. 2c). The potentials across them are again reversed by inductors 31 and 36 respectively. Capacitor 32 charges in the direction from left to right as seen in FIG. 1 through a series circuit including diode 44, the lower half of inductor 30, inductor 31, capacitor 32 and controlled rectifier 4. Similarly, capacitor 37 charges through a series current path including inductor 36, the upper half of inductor 35, diode 45 and controlled rectifier 5. Capacitors 32 and 36 are now charged for commutation at the end of the first half-cycle.

The inverter circuit then provides a voltage of a first polarity at output terminals 7 and 8 for the first half-cycle of the inverter output frequency $f_o$. Some time before the end of the first half-cycle, the gate signal is removed from the gates of controlled rectifiers 4 and 5, as for example at time $t_4$ (FIG. 2d). The controlled rectifiers continue to conduct, however, until commutated.

The end of the first half-cycle of output voltage is initiated at a time approximately $1/2f_o$ seconds after time $t_0$, where $f_o$ is the output frequency of the inverter circuit which is determined by the output of the triggering source (not shown). Controlled rectifiers 24 and 25 are simultaneously triggered at time $t_5$ (FIG. 2b). At this time, current is flowing from terminal 1 through controlled rectifier 5, load B and controlled rectifier 4, to terminal 2. Triggering controlled rectifier 24 closes the circuit including that rectifier, diode 14, capacitor 32, inductor 31, and the lower half of inductor 30, so that capacitor 32 discharges therethrough. This voltage across diode 14 reverse-biases controlled rectifier 4 and turns it off. Similarly, controlled rectifier 5 is turned off by the voltage across diode 15, which is in a series current path with controlled rectifier 25, the upper half of inductor 35, inductor 36, and capacitor 37. The current flow thus established to the capacitors 32 and 37 provides the polarities of charge on them needed for the forthcoming switching of voltage across load B. These charges are of the opposite polarity to those applied between times $t_0$ and $t_1$.

At time $t_6$ which occurs $1/2f_s$ seconds after $t_5$, the commutating controlled rectifiers 23 and 26 are triggered (FIG. 2a), and capacitors 32 and 37 discharge in a direction opposite to the load voltage to switch the load voltage. Then at time $t_7$, after the load voltage has been thus commutated, controlled rectifiers 3 and 6 are gated and latch into the circuit. Once again, the term latch is used to describe the operation of tee controlled rectifiers 3 and 6 as they become conductive when the voltage across them is low, and they gradually come into full conduction as load current increases. At this time the voltage of the source A also appears across terminals 1 and across controlled rectifier 5 which has been turned off. The presence of diode 15 across controlled rectifier 5 not only serves its prior-described function of providing a charging path for capacitor 37, but also prevents accidental turning on of controlled rectifier 5, which would create a short circuit. Current now flows through controlled rectifiers 3 and 6 and will continue to do so until the next half-cycle, the beginning of which is also shown in FIG. 2.

In the circuit of FIG. 1, the first and second inductor portions which comprise the upper and lower halves of inductor 30 utilize commutation energy to provide positive self-commutation of the commutating controlled rectifiers 23 and 24. More specifically, when controlled rectifier 23 is gated on, due to the coupling between the upper and lower halves of inductor 30, controlled rectifier 24 is forced off. Positive self-commutation of controlled rectifiers 25 and 26 is also provided due to coupling between the inductor portions comprising the upper and lower halves of inductor 35.

FIG. 3 is illustrative of a half-bridge embodiment of the present invention in which the arrangement of inductor components is modified. The same reference numerals are used to denote elements connected similarly and performing the same function as those in FIG. 1. The inductor 35 is replaced by upper and lower inductor portions 55 and 56. A circle intersecting both the inductor portions 55 and 56 is shown in FIG. 3 to indicate that there is a loose coupling between those inductor portions. The inductor 36 is not needed in this embodiment since inductors 55 and 56 serve to reverse the charge on capacitor 37. Due to the coupling between inductor portions 55 and 56, positive self-commutation of controlled rectifiers 25 and 26 is provided.

The half bridge arrangement comprises main controlled rectifiers 5 and 6, commutating controlled rectifiers 25 and 26, and the previously described commutating circuitry. The inverter is once again connected to source terminals 1 and 2. Load terminal 8 is once again connected to one terminal of load B. However, the other terminal of load B is connected to a level of potential intermediate that of source terminals 1 and 2, which is shown as conveniently comprising ground potential. Either the inductor scheme comprising inductors 35 and 36 may be used in this circuit, or the inductor portions 55 and 56 may be used as shown. Operation of this circuit is the same as that of the circuit of FIG. 1.

Thus the present invention comprises an operation where separate operations are performed in three successive inverter frequency half-cycles for each output frequency half-cycle. In the first inverter frequency half-cycle, capacitors 32 and 37 are discharged to commutate conducting controlled rectifiers and then recharged to an energy level sufficient to switch the load voltage. In the second half-cycle, commutating controlled rectifiers are fired so that capacitors 32 and 37 discharge to switch load voltage. During the second half-cycle the nonconducting main controlled rectifiers are gated and latch into conduction. During the third half-cycle, capacitors 32 and 37 recycle to their original charge through conduction paths provided with the inverter circuit to charge to a level for commutation of the conducting controlled rectifiers at the end of the half-cycle. Prevention of short circuiting of the inverter circuit, provision of sufficient voltage for switching the load, and latching of the main controlled rectifiers which are to be conductive for a half-cycle are always assured.

It should be noted here that the source for gating each of the controlled rectifiers is not a part of the source and load voltage switching circuitry. Any conventional gating signal source may be used, as for example the ring counter mentioned hereinbefore or the gating signal generator, described in U.S. Pat. No. 3,207,974, which issued Sept. 21, 1965 to McMurray and is of common assignee with the present application, with the gates of the controlled rectifiers being appropriately connected to such gating signal source as shown at 60 in FIG. 3.

The present invention is applicable to standard types of inverter circuits, including half and full bridge arrangements. Different forms of the invention have been illustrated in the specification with a view toward enabling those skilled in the art to make many modifications in the specific circuitry illustrated to produce an inverter circuit constructed in accordance with the present invention.

What We claim as new and desire to be secured by Letters Patent of the United States is:

1. An inverter circuit comprising:
   a. first and second main controlled rectifiers connected in series for conduction in the same direction for connection across a direct current voltage source, and a terminal intermediate said first and second main controlled rectifiers for connection to a load;
   b. first and second commutating controlled rectifiers connected in series across said first and second main controlled rectifiers;
   c. first and second inductor portions connected in series between said first and second commutating controlled rectifiers and having a second terminal intermediate said first and second inductor portions;
   d. a capacitor connected between said first and second terminals;
   e. first, second, third and fourth diodes for connection across said first and second and main controlled rectifiers and said first and second commutating controlled rectifiers respectively and being oppositely poled with respect thereto; and
   f. means for gating in order said first commutating controlled rectifier, said second commutating controlled rectifier, and said second main controlled rectifier in order to initiate a first half-cycle of inverter operation, and means for gating in order said second commutating controlled rectifier, said first commutating controlling rectifier and said first main controlled rectifier to initiate a second half-cycle.

2. An inverter circuit according to claim 1 in which magnetic coupling is provided between said first and second inductor portions.

3. An inverter circuit according to claim 2 further comprising an inductor connected between said capacitor and said terminal intermediate said first and second inductor portions.

4. An inverter circuit comprising:
   a. first and second controlled rectifiers connected in series and having a first terminal intermediate them, and third and fourth controlled rectifiers connected in series and having a second terminal intermediate them, said first and second and said third and fourth controlled rectifiers all being poled in the same direction for connection across a direct current voltage source and said first and second terminals providing connection to a load;
   b. first and second commutating controlled rectifiers connected across said first and second main controlled rectifiers;
   c. first and second inductor portions connected intermediate said commutating controlled rectifiers and having a terminal intermediate them;
   d. a capacitor connected between said terminal intermediate said first and second inductor portions and said first terminal;

e. third and fourth commutating controlled rectifiers connected across said third and fourth main controlled rectifiers;

f. third and fourth inductor portions connected between said third and fourth commutating controlled rectifiers and having a terminal intermediate them;

g. a second capacitor connected between the terminal intermediate said third and fourth inductor portions and said second terminal;

h. a diode connected across each of said main and commutating controlled rectifiers being poled in a direction opposite that of its associated controlled rectifier; and i. means for simultaneously gating in order said first and third commutating controlled rectifiers, said second and fourth commutating controlled rectifiers, and said second and third main controlled rectifiers to initiate a first inverter output frequency half-cycle, and means for gating simultaneously in order said second and third commutating controlled rectifier, said first and fourth commutating controlled rectifiers, and said first and fourth main controlled rectifiers for initiating a second half-cycle of inverter circuit output frequency.

5. An inverter circuit according to claim 4 in which magnetic coupling is provided between said first and second inductor portions and between said third and fourth inductor portions.

6. A bridge type inverter circuit according to claim 5 further comprising a first inductor connected between said first capacitor and the terminal intermediate said first and second inductor portions, and a second inductor connected in series between said second capacitor and the terminal intermediate said third and fourth inductor portions.

7. An inverter according to claim 6 for further comprising a resistor connected between a point intermediate said first capacitor and first inductor and a first terminal of the source, and a second resistor connected between a point intermediate said second capacitor and second inductor and a second terminal of said source.

8. A bridge inverter circuit comprising in combination:

a. a bridge including first, second, third and fourth bridge legs, said bridge having upper and lower terminals for connection to a direct current voltage source, and first and second intermediate terminals for connection to a load, each bridge leg including a controlled rectifier poled in the same direction;

b. first, second, third and fourth commutating legs, each leg being connected for conduction between the same source and load terminal as the first, second, third, and fourth bridge legs respectively, each commutating leg including a controlled rectifier and an inductor portion connected in series from the source to the load;

c. a first capacitor having a first terminal connected to said first intermediate terminal and a second terminal connected to the inductors in said first and second commutating legs, and a second capacitor having a first terminal connected to said second intermediate terminal and a second terminal connected to the inductors in said third and fourth commutating legs;

d. means in each commutating and bridge leg for providing a conduction path for charging and discharging of said capacitor, the means in each leg providing for conduction in a direction opposite to that of its associated controlled rectifier; and e. means for simultaneously rendering conductive in order said first and fourth commutating legs, said second and third commutating legs, and said second and third bridge legs to initiate a first half-cycle of inverter output frequency, and means for rendering conductive simultaneously in order said second and third commutating legs, said second and fourth commutating legs, and said first and fourth bridge legs for initiating a second half-cycle of inverter output frequency.

9. A bridge inverter according to claim 8 further comprising a first inductor connected between said first capacitor and said first and second commutating legs, and a second inductor connected between said second capacitor and said third and fourth commutating legs.

10. An inverter circuit according to claim 9 further including a first resistor connected between said upper source terminal and the second terminal of said first capacitor, and a second resistor connected between said lower source terminal and the second terminal of said second capacitor.